US012750722B2

(12) United States Patent
Fang et al.

(10) Patent No.: US 12,750,722 B2
(45) Date of Patent: Sep. 29, 2026

(54) TRANSMISSION RELIABILITY TRANSMISSION FOR WIRELESS TIME SENSITIVE NETWORKS

(71) Applicant: MediaTek Singapore Pte. Ltd., Singapore (SG)

(72) Inventors: Yonggang Fang, San Jose, CA (US); James Chih-Shi Yee, San Jose, CA (US); Chien-Fang Hsu, Hsinchu City (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 498 days.

(21) Appl. No.: 17/845,697

(22) Filed: Jun. 21, 2022

(65) Prior Publication Data

US 2022/0417787 A1 Dec. 29, 2022

Related U.S. Application Data

(60) Provisional application No. 63/214,864, filed on Jun. 25, 2021.

(51) Int. Cl.
*H04W 28/02* (2009.01)

(52) U.S. Cl.
CPC ............................... *H04W 28/0268* (2013.01)

(58) Field of Classification Search
CPC ......... H04W 28/0268; H04W 72/0446; H04W 24/02; H04W 24/08; H04W 56/00; H04L 1/189
See application file for complete search history.

(56) References Cited

U.S. PATENT DOCUMENTS

2008/0096562 A1* 4/2008 Wu .................. H04W 36/0011 455/436
2009/0011768 A1* 1/2009 Seok .................... H04W 24/08 455/450
2019/0253927 A1* 8/2019 Mok ................ H04W 28/0268
2019/0289494 A1* 9/2019 Yamaura ............. G06F 11/1637
2019/0335379 A1* 10/2019 Joseph .................... H04L 1/189
2020/0059829 A1* 2/2020 Joseph .............. H04W 36/0011
2021/0075675 A1* 3/2021 Cavalcanti .......... H04L 41/0823
2021/0120552 A1* 4/2021 Fang ................ H04W 72/0446
2021/0218686 A1* 7/2021 Galeev .................... H04L 43/08

(Continued)

*Primary Examiner* — Liem H. Nguyen

(57) ABSTRACT

Embodiments of the present invention provide systems, devices and methods of wireless communications that improve transmission reliability for time sensitive traffic over multiple wireless communication links in a wireless TSN. The transmitting device can be configured for uplink QoS transmission according to transmission QoS information (e.g., a traffic profile) received from a TSN configuration server or from an application running on the transmitting device. For uplink transmission, the transmitting device can be a wireless STA or STA MLD operating over multiple wireless links to communicate with one or more wireless TSN-capable APs. The transmitting device can duplicate a frame for transmission when the measured transmission reliability is below a predetermined threshold of transmission reliability requirement. For downlink transmission, the transmitting device can be an AP MLD in communication with a TSN capable non-AP MLD for transmitting a duplicate transmission.

17 Claims, 8 Drawing Sheets

(56) References Cited

U.S. PATENT DOCUMENTS

| | | | | |
|---|---|---|---|---|
| 2021/0274489 | A1* | 9/2021 | Fang | H04W 72/0446 |
| 2022/0014945 | A1* | 1/2022 | Patel | H04L 45/24 |
| 2022/0150755 | A1* | 5/2022 | Zheng | H04W 28/0252 |
| 2022/0210696 | A1* | 6/2022 | Cavalcanti | H04W 28/06 |

* cited by examiner

TRANSMISSION RELIABILITY TRANSMISSION FOR WIRELESS TIME SENSITIVE NETWORKS

CROSS-REFERENCE TO RELATED APPLICATIONS

This application claims the benefit of and priority to provisional patent application Ser. No. 63/214,864, with filing date Jun. 25, 2021, by Yonggang Fang, et al., which is hereby incorporated by reference in its entirety.

FIELD

Embodiments of the present invention generally relate to the field of wireless communications. More specifically, embodiments of the present invention relate to systems and methods of communication in wireless time sensitive networks.

BACKGROUND

Modern electronic devices typically send and receive data with other electronic devices wirelessly using Wi-Fi, and many of these electronic devices are "dual band" devices that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

The use of a single band may not satisfy the bandwidth or latency needs of certain devices. Therefore, some developing approaches to wireless communication increase communication bandwidth by operating on multiple bands concurrently (technically called link aggregation or multi-link operation). Advantageously, multi-link operations can provide higher network throughput and improved network flexibility compared to traditional techniques for wireless communication.

Additionally, some networks operate using special timing requirements for time-sensitive transmission of data in deterministic networks. For example, time-sensitive networking (TSN) is a set of standards that defines requirements of time synchronization, scheduling and traffic shaping, and communication path selection, reservation, and fault tolerance to introduce the concept of "time" for network communication. Examples of TSN use cases include control networks that receive inputs from sensors, perform control loop processing, and initiate actions, safety-critical networks that implement packet and link redundancy, and mixed media networks that handle data with varying levels of timing sensitivity and priority, such as vehicle networks that support climate control, infotainment, body electronics, and driver assistance. TSN standards serve as the foundation for deterministic networking to satisfy the common requirements of these applications. TSN can provide timing synchronization of network entities in the TSN network. TSN also provides a mechanism of frame replication and elimination for reliable transmission.

Heretofore, TSN standards have been implemented as a link layer technology on wired network, like Ethernet. An approach to time-sensitive communication incorporated with TSN standards for wireless devices is desired.

SUMMARY

What is needed is an approach to time-sensitive communication leveraging TSN standards that can be used to communicate over wireless networks, including wireless communications over multiple wireless links by multi-link devices (MLDs). Wireless Local Area Network (WLAN) integrated with TSN can advantageously make the timing of APs synchronized in an extended service set (ESS). Moreover, as transmission failure rate in WLAN can highly impact time sensitive applications, a TSN transmission mechanism can improve transmission reliability using duplicating transmission over one or more links and/or one or more APs.

Accordingly, embodiments of the present invention provide systems, devices and methods of wireless communications that improve transmission reliability for time sensitive traffic over multiple wireless communication links in a wireless TSN. The transmitting device can be configured for uplink QoS transmission according to transmission QoS information (e.g., a traffic profile) received from a TSN configuration server or from an application running on the transmitting device. For uplink transmission, the transmitting device can be a wireless STA or STA MLD operating over multiple wireless links to communicate with one or more wireless TSN-capable APs. The transmitting device can duplicate a frame for transmission when the measured transmission reliability is below a predetermined threshold of transmission reliability requirement.

According to one embodiment, a method of wireless data transmission in a wireless time sensitive network (TSN) by a TSN-capable wireless station (STA) is disclosed. The method includes receiving transmission information for wireless TSN transmission, configuring the TSN-capable STA for uplink transmission according to the transmission information, duplicating a frame for transmission over the wireless TSN, transmitting the frame to a first wireless access point (AP) over the wireless TSN, and transmitting a duplicate frame to second wireless AP over the wireless TSN.

According to some embodiments, the method includes determining if frame duplication is to be performed according to the transmission information, and where the transmission information includes a traffic profile.

According to some embodiments, the traffic profile includes a Delay Bound value and an Expected Transmission Reliability (ETR) value.

According to some embodiments, the method includes determining a transmission reliability threshold for each wireless link of the MLD according to the traffic profile, and the duplicating a frame for transmission over the wireless TSN is performed responsive to a determination that a transmission reliability of a wireless link of the wireless TSN is below the transmission reliability threshold.

According to some embodiments, the method includes measuring a transmission reliability for transmitting data to the first wireless AP over the first wireless link.

According to some embodiments, the measuring includes calculating a percentage of QoS packets of a traffic category (e.g., TID) from or to the STA that are successfully transmitted over the wireless link within the Delay Bound value for the traffic category over the total transmitted QoS packets of the traffic category from or to the STA on the wireless link.

According to some embodiments, the transmission information is received from a TSN configuration server.

According to another embodiment, a method of wireless data transmission in a wireless time sensitive network (TSN) by a wireless station (STA) multi-link device (MLD) is disclosed. The method includes receiving transmission QoS information, configuring the STA MLD for uplink transmission according to the transmission QoS information, duplicating a frame for transmission over the wireless TSN, transmitting the frame to a wireless access point (AP) MLD over a first wireless link of the wireless TSN, and transmitting a duplicate frame to the wireless AP MLD over a second wireless link of the wireless TSN.

According to some embodiments, the method includes determining if frame duplication is to be performed according to the transmission information, and where the transmission information includes a traffic profile.

According to some embodiments, the traffic profile includes a Delay Bound value and an Expected Transmission Reliability (ETR) value for a traffic category.

According to some embodiments, the method includes determining a transmission reliability threshold for each wireless link of the MLD according to the traffic profile, and the duplicating a frame for transmission over the wireless TSN is performed responsive to a determination that a transmission reliability of the first wireless link of the wireless TSN is below the transmission reliability threshold for the wireless link.

According to some embodiments, the method includes measuring a transmission reliability for transmitting data to the wireless AP MLD over the first wireless link.

According to some embodiments, the method includes the measuring includes at least one of calculating a ratio of a number of QoS packets of the traffic category that are successfully transmitted over the first wireless link within the Delay Bound value for the traffic category to a total number of transmitted QoS packets of the traffic category on the first wireless link, and calculating a ratio of a number of QoS packets of the traffic category that are successfully transmitted over all wireless transmitting links within the Delay Bound value for the traffic category to a total number of transmitted QoS packets of the traffic category on all wireless links.

According to some embodiments, the transmission information is received from a TSN configuration server.

According to a different embodiment, an apparatus for wireless data transmission in a wireless time sensitive network (TSN) by a wireless station (STA) multi-link device (MLD) is disclosed. The apparatus includes a processor, a memory coupled to the processor and for storing data, and a plurality of radios operable to perform wireless TSN transmission. The processor is operable to store transmission information in the memory, configure uplink transmission according to the transmission information, duplicate a frame for transmission over the wireless TSN (WTSN), transmit the frame to a wireless access point (AP) MLD over a first wireless link of the WTSN, and transmit a duplicate frame to the wireless AP MLD over a second wireless link of the WTSN.

According to some embodiments, the processor is further operable to determine if frame duplication is to be performed according to the transmission information, and where the transmission information includes a traffic profile.

According to some embodiments, the traffic profile includes a Delay Bound value and an Expected Transmission Reliability (ETR) value for a traffic category.

According to some embodiments, the processor is further operable to determine a transmission reliability threshold according to the traffic profile, and where the duplicate a frame for transmission over the wireless link is performed responsive to a determination that a transmission reliability of the first wireless link of the wireless TSN is below the transmission reliability threshold for the wireless link.

According to some embodiments, the processor is further operable to measure a transmission reliability for transmitting data to the wireless AP MLD over the first wireless link.

According to some embodiments, the measure includes at least one of calculating a ratio of a number of QoS packets of the traffic category that are successfully transmitted over the first wireless link within the Delay Bound value for the traffic category to a total number of transmitted QoS packets of the traffic category on the first wireless link, and calculating a ratio of a number of QoS packets of the traffic category that are successfully transmitted over all wireless transmitting links within the Delay Bound value for the traffic category to a total number of transmitted QoS packets of the traffic category on all wireless links.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
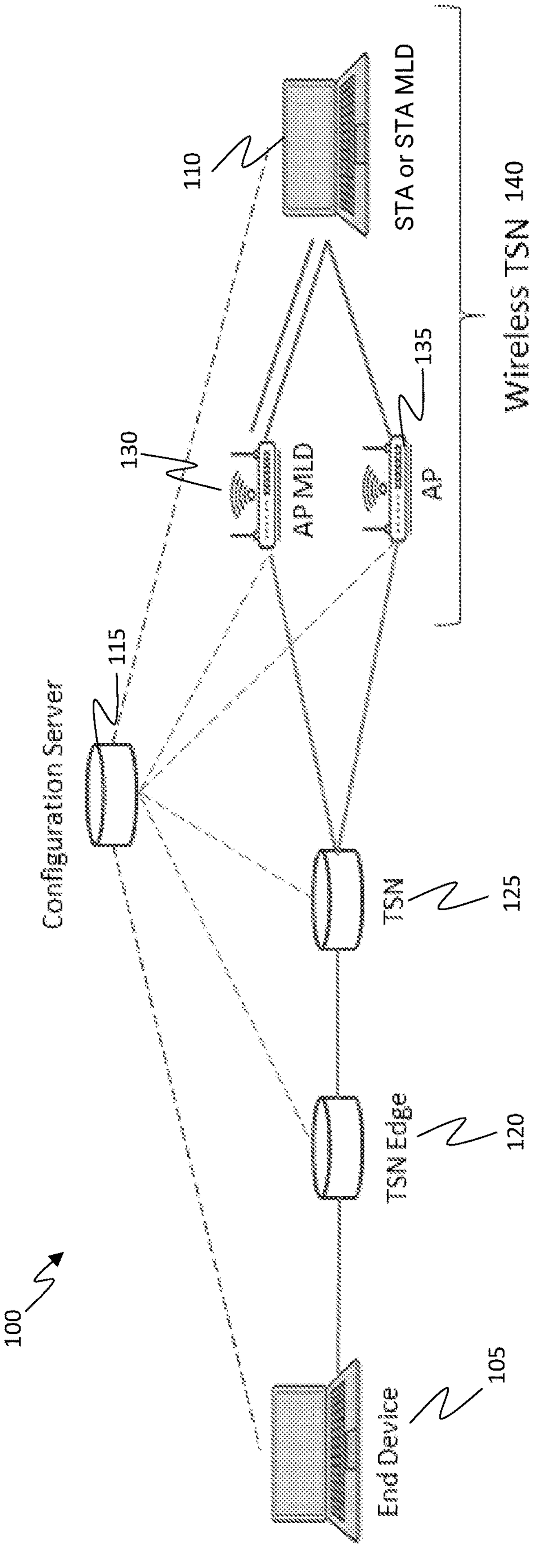
FIG. 1 is a diagram of an exemplary time sensitive network TSN having a TSN configuration server that configures network devices for wireless TSN transmissions between end devices according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 6-7) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Transmission Techniques for Wireless Time Sensitive Networks

Embodiments of the present invention provide systems, devices and methods of wireless communications that improve transmission reliability for time sensitive transmission over multiple wireless communication links in a wireless TSN. The transmitting device can be configured for uplink transmission according to transmission information (e.g., a traffic profile) received from a TSN configuration server or an application running on the transmission device. The transmitting device can be a wireless STA or STA MLD operating over multiple wireless links to communicate with one or more TSN-capable APs or AP MLDs. The transmitting device can duplicate a frame for transmission to improve transmission reliability when the measured transmission reliability is below a predetermined threshold of transmission reliability requirement. The transmitting device can also be an AP or AP MLD of WTSN, operating on multiple wireless links. The transmitting AP or AP MLD can be configured for downlink QoS transmission according to transmission information (e.g., a traffic profile) received from a TSN configuration server or an associated STA or STA MLD. When receiving QoS data from a network entity of the TSN, the AP or AP MLD can transmit the QoS data to an associated STA or STA MLD over one or more wireless links according to the transmission configuration.

FIG. 1 depicts an exemplary time sensitive network TSN 100 having a TSN configuration server (CS) 115 that configures network devices for wireless TSN (WTSN) transmission to communicate with end devices of TSN 100 according to embodiments of the present invention. TSN 100 includes TSN capable APs 130 and 135 for servicing TSN capable wireless stations (STAs) of WTSN 100. In the example of FIG. 1, AP 130 is a multi-link device (MLD) AP operating over multiple wireless links. TSN CS 115 can configure a TSN capable STA or STA MLD, AP or AP MLD such as STA or STA MLD 110, AP 135 or AP MLD 130, via an upper layer protocol over a management interface between CS 115 and a station management entity (SME) of the TSN capable STA or STA MLD, AP or AP MLD correspondingly. The SME is a layer-independent entity that may be viewed as residing in a separate management plane.

TSN CS 115 can configure a TSN capable AP or AP MLD (e.g., AP MLD 130 and AP 135) through a control interface between TSN CS 115 and an SME of the TSN capable AP or AP MLD. AP MLD 130 and AP 135 can transmit and receive data frames over TSN 100 through a distribution system (DS) of the TSN capable AP or AP MLD. In FIG. 1, end device 105, TSN edge server 120, TSN network device 125, AP MLD 130, and AP 135 are communicatively coupled using wired network, like Ethernet. TSN network device 125 can be a network entity (e.g., a network switch) executing a TSN protocol. AP MLD 130 and AP 135 communicate with end device (e.g., STA or STA MLD) 110 wirelessly (over WLAN). CS 115 communicates with TSN edge server 120, TSN network device 125, AP MLD 130, and AP 135 using wired network, like Ethernet, and communicates with end device 105 through TSN edge node 120 over wired network and device 110 through AP 135 or AP MLD 130 wirelessly (WLAN). AP MLD 130, AP 135, and STA 110 can be considered components of a wireless TSN (WTSN) 140 for performing TSN communications wirelessly according to embodiments of the present invention.

Figure 2:
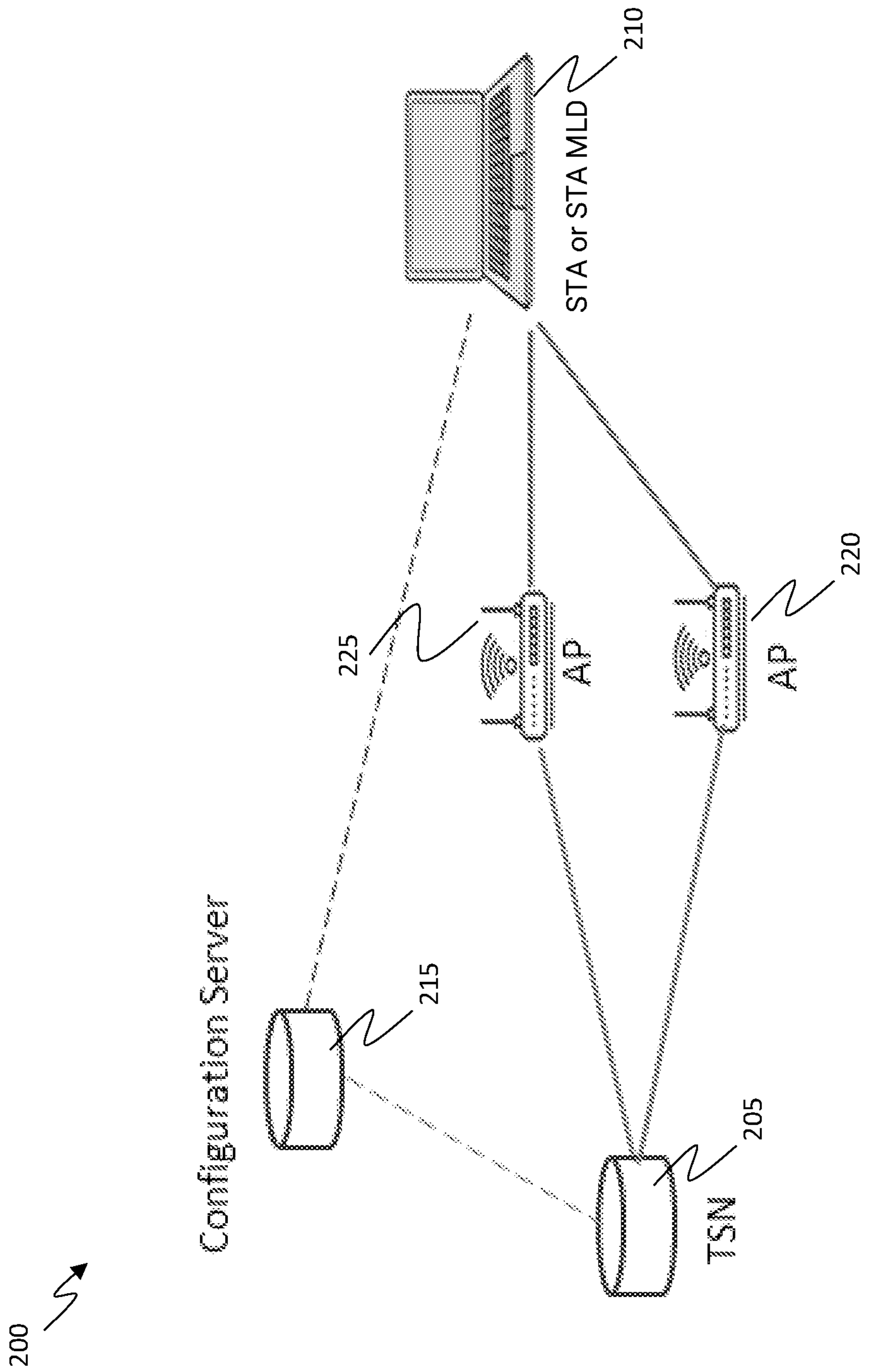
FIG. 2 is a diagram of an exemplary multi-AP wireless TSN that performs frame duplication for wireless transmission between a TSN network entity and a TSN-capable STA or STA MLD according to embodiments of the present invention.

FIG. 2 depicts an exemplary multi-AP WTSN 200 for wireless transmission between a TSN network entity 205 (e.g., a TSN switch) and an STA or STA MLD 210 using frame duplication to improve transmission reliability according to embodiments of the present invention. Network devices of WTSN 200 are configured by a TSN CS 215. STA or STA MLD 210 can duplicate a frame or traffic stream according to transmission configuration which is determined by transmission QoS values defined in a traffic profile configured by an SME through a Media Access Control (MAC) Sublayer Management Entity (MLME) interface. The transmission QoS values can include Delay Bound (time) and expected transmission reliability (ETR) values for a traffic category that establish a predetermined threshold of a wireless link for reliability of transmission.

The included Delay Bound value specifies the maximum amount of time for transporting an MSDU or A-MSDU belonging to the traffic stream (TS) of a traffic specification (TSPEC) or QoS characteristics. For example, a non-AP STA or STA MLD (e.g., STA 210) can duplicate a frame or traffic stream according to the Delay Bound and ETR values for a traffic category associated with a MAC service data unit (MSDU) sent by a logical link control (LLC) through a data interface (e.g., MAC Service Access Point MAC-SAP interface) to improve reliability of wireless transmissions. A non-AP STA or STA MLD can also duplicate a frame or traffic stream according to the Delay Bound value, the ETR value for the traffic category, and a transmission reliability measurement result as measured by the non-AP STA or STA MLD 210. The duplicated frames/packets are sent to multiple APs and/or AP MLDs (e.g., AP 220 and AP 225) over the wireless medium. For example, the measurement result can be a quality of service (QoS) measurement in the term of ratio of the number of successfully delivered QoS packets of the traffic category within the Delay Bound time period compared to the total number of transmitted user QoS packets of the traffic category in the measurement period.

Figure 3:
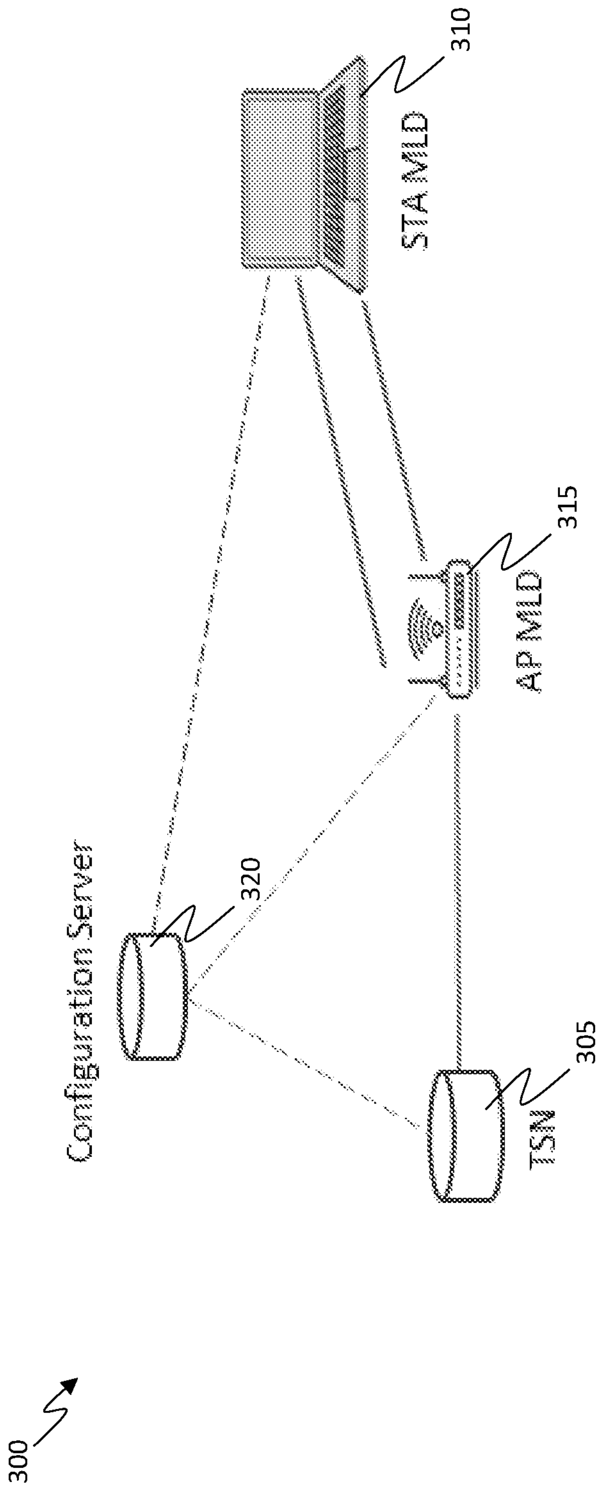
FIG. 3 depicts an exemplary wireless TSN for wireless transmission between a TSN network entity and a TSN-capable STA or STA MLD using frame duplication for transmitting data to a single wireless AP MLD according to embodiments of the present invention.

FIG. 3 depicts an exemplary WTSN 300 for wireless transmission between a TSN network entity 305 and a TSN-capable STA MLD 310 using frame duplication for transmitting data to a single wireless AP MLD 315 according to embodiments of the present invention. The network entities of WTSN 300 are configured for wireless time sensitive transmission by TSN CS 320. For example, TSN CS 320 can initiate configuration of STA MLD 310 and AP MLD 315 with traffic profile (e.g., TSPEC, or QoS characteristics) and transmission service period (e.g., restricted Target Wakeup Time (TWT) service period (SP) for periodical QoS transmission). TSN CS 320 may configure a TSN entity 305 to sync-up its Gate-On period with the transmission SP of AP MLD 315. AP MLD 315 communicates wirelessly with STA MLD 310 for QoS transmission over multiple wireless links at the scheduled transmission SP. TSN network entity 305 can route packets to a destination end point device (e.g., STA or STA MLD).

When a packet is sent wirelessly to an MLD (e.g., AP MLD 315) through a MAC-SAP interface, the MLD can duplicate the packet and send the packets (the original packet and the duplicate packet) to another MLD (e.g., STA MLD 310) over multiple wireless links, or can send the packets in one or more PPDUs over a single wireless link. The MLD can determine whether to duplicate a frame or stream according to Delay Bound and ETR values of a traffic profile for a time sensitive application configured by a SME through an MLME interface. The MLD can also determine whether to duplicate a frame or stream according to the Delay Bound and ETR values associated with an MSDU sent through a data interface (e.g., MAC-SAP), or according to the Delay Bound and ETR values with the transmission reliability measurement result as measured by STA MLD 310.

For performing downlink transmissions, the transmitting device can be an AP MLD in communication with a TSN capable non-AP MLD for transmitting a duplicate transmission. The AP MLD can be configured for downlink QoS transmission according to transmission QoS information (e.g., a traffic profile) received from a TSN configuration server or from an application running on the transmitting device. Accordingly, the AP MLD can duplicate a frame for transmission when the measured transmission reliability is below a predetermined threshold of transmission reliability requirement. For example, for a downlink transmission, the AP MLD can determine whether to duplicate a frame or stream according to Delay Bound and ETR values in a traffic profile for a time sensitive application configured by a SME through an MLME interface.

Figure 4:
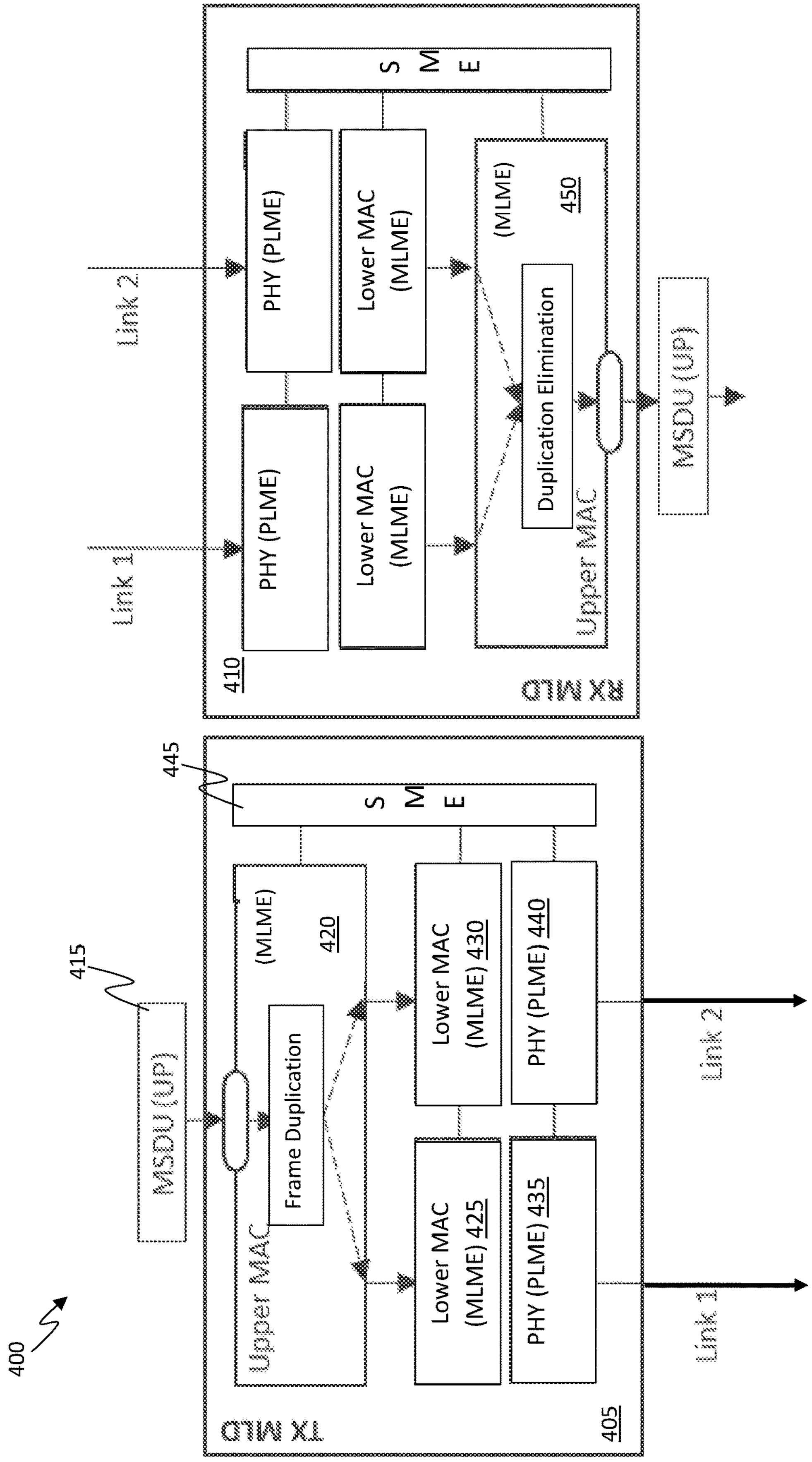
FIG. 4 is a block diagram of exemplary MLDs performing wireless transmissions over multiple wireless links using integrated TSN frame duplication function according to embodiments of the present invention.

FIG. 4 depicts exemplary MLDs 405 and 410 for performing WTSN transmissions using frame duplication over multiple links (Link 1 and Link 2) according to embodiments of the present invention. An MSDU 415 for uplink transmission is received by upper MAC sublayer 420. According to the information of traffic profile associated with this MSDU, it is expected to use duplicate transmission for improving transmission reliability, for example. MSDU 415 is duplicated and passed to lower MAC sublayers 425 and 430 of Link 1 and Link 2, respectively. The frames are then passed to PHY sublayer 435 and 440 for transmission over the wireless medium. SME 445 of transmitting MLD 405 can configure the upper MAC sublayer 420 based on the Delay Bound and ETR values of a traffic profile for duplicating transmission (or non-duplicating transmission) and can set the TID-to-Link mapping table to map the traffic (MSDU) identified by TID, and/or stream ID to the corresponding links for duplicating transmissions.

When upper MAC sublayer 420 of transmitting MLD 405 is configured for duplicating transmission, upper MAC sublayer 420 duplicates MSDU 415 using the same frame identifier. A duplicated packet identifier can consist of:

1. A destination MLD MAC address, a source MLD MAC address and a sequence number; or
2. A stream ID and a sequence number.

A frame duplication elimination function integrated in upper MAC sublayer 450 of receiving MLD 410 can eliminate received duplicated MSDU(s) based on the MLD block acknowledgment (BA) agreement. Otherwise, when the upper MAC sublayer 420 of transmitting MLD 405 is not configured for duplicating transmission, upper MAC sublayer 420 does not duplicate MSDU 415 and forwards MSDU 415 to one or more links (e.g., Link 1 and/or Link 2) specified in TID-to-Link mapping.

Transmission QoS information for time sensitive transmission typically includes Delay Bound and ETR values. Table I below depicts exemplary ETR values indicating an estimated probability of reliable transmission during a Delay Bound time period for determining if a duplicating transmission is performed in a WTSN to improve reliability according to embodiments of the present invention.

TABLE I

| ETR Value | Definition |
|---|---|
| 0 | Non duplicating transmission |
| 1 | 80% |

TABLE I-continued

| ETR Value | Definition |
|---|---|
| 2 | 85% |
| 3 | 90% |
| 4 | 95% |
| 5 | 96% |
| 6 | 97% |
| 7 | 98% |
| 8 | 99% |
| 9 | 99.9% |
| 10 | Duplicating transmission |
| Other | Reserved |

The ETR values in Table I can be used by an SME or LLC to support different reliable transmission methods. An SME or LLC can provision an MLD to:

1. Duplicate transmission for reliable delivery of user packet (e.g. set ETR=10);
2. Not duplicate transmission (e.g. set ETR=0); or
3. Make a determination of reliable transmission and/or schedule low latency traffic according to a transmission reliability expectation (e.g., an ETR value between 1 to 9) and transmission reliability measurement result. For example, if the ETR is set to 9, which indicates a 99.9% transmission reliability requirement, frame duplication will be performed if a transmission reliability measurement result performed by an STA MLD or AP MLD indicates reliable transmission of less than 99.9%.

Transmission reliability information can be carried through the interface of an MLME-ADDTS, MLME-SCS, or MLM-MSCS for configuration of low latency and/or high reliability traffic. The Delay Bound value for a traffic category contains an unsigned integer that specifies the maximum amount of time (e.g., in microseconds) to transport an MSDU or A-MSDU belonging to the TS in this TSPEC (or QoS characteristics) element, measured between the time marking the arrival of the MSDU (or the first MSDU of an A-MSDU) at the local MAC sublayer from the local MAC-SAP interface and the time of completion of the successful transmission or retransmission of the MSDU or A-MSDU to the destination. The ETR value is an unsigned integer that specifies the percentage of QoS packets of a traffic category that are expected to be reliably (i.e., successfully) transmitted within the Delay Bound over the total number of transmitted QoS packets of the traffic category. If the ETR value is 0, the transmitting STA or MLD is not expected to use duplicating QoS transmission, for example. If the ETR value is 10, the transmitting STA or MLD is expected to use duplicating transmission of MSDUs over multi-links, or consecutive duplicated PPDUs on a single wireless link, for example. For values between 0 and 10, frame duplication is performed when it is necessary to satisfy the indicated level of expected transmission reliability.

Figure 5:
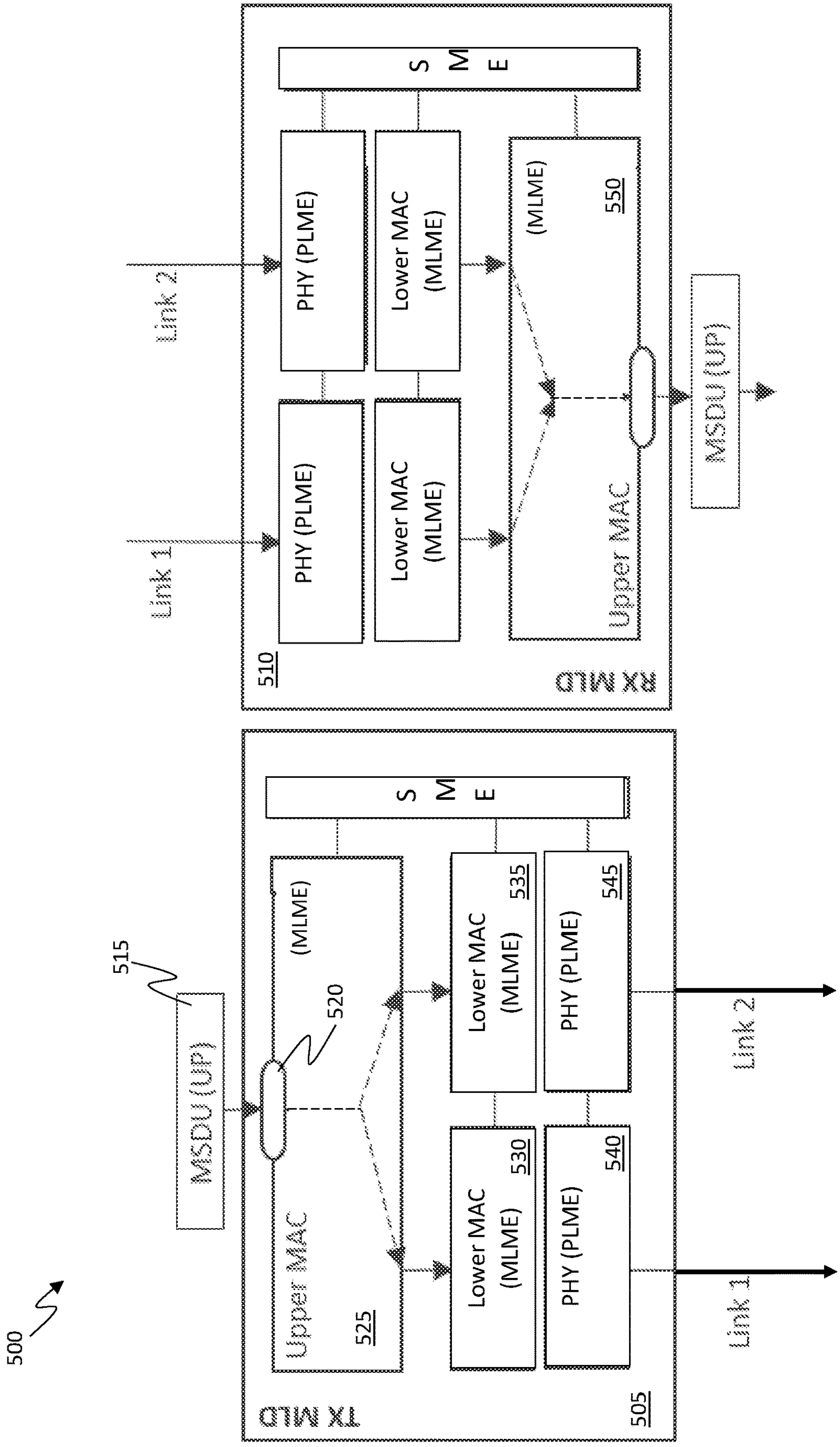
FIG. 5 is a block diagram of exemplary MLDs for performing wireless transmissions over multiple wireless links using an internal frame duplication function according to embodiments of the present invention.

FIG. 5 depicts exemplary MLDs 505 and 510 for performing frame duplication for WTSN transmissions over multiple links (Link 1 and Link 2) using an internal duplication function according to embodiments of the present invention. In the example of FIG. 5, the LLC sends MSDU 515 with user priority (UP) through a MAC-SAP interface 520 with Delay Bound and ETR values (explicitly or implicitly) for the traffic category. According to the Delay Bound and ETR values, the upper MAC sublayer 525 of transmitting MLD 505 configures its internal duplication function for duplicating or non-duplicating QoS transmission, and sets the TID-to-Link mapping table to map the traffic (MSDU) identified by TID (and/or stream ID) to the corresponding wireless link(s).

If upper MAC sublayer 525 of transmitting MLD 505 is configured to perform duplicating transmission, the upper MAC sublayer 525 duplicates MSDU 515 using the same identifier. The duplicated stream identifier can consist of a destination MLD MAC address, a source MLD MAC address, and a Sequence Number, or a Stream ID and Sequence Number. The MAC sublayer 525 distributes duplicated MSDUs to lower MAC sublayers 530 and 535 for transmission over multiple links, or distributes duplicated MSDUs to the lower MAC sublayers (e.g., 530 or 535) and the PHY sublayer (e.g., PHY 540 or 545) of a single link, and transmits the MPDUs in a PPDU (or multiple PPDUs). Upper MAC 550 of receiving MLD 510 eliminates duplicated MSDU(s) received from Link 1 and/or Link 2 based on the MLD BA agreement. Otherwise, if the upper MAC sublayer 525 of transmitting MLD 505 is configured to perform non-duplicating transmission, the upper MAC sublayer 525 of transmitting MLD 505 does not duplicate MSDU 515 and forwards MSDU 515 to the lower MAC sublayers (e.g., 530 and/or 535) and the PHY sublayer (e.g., PHY 540 and/or 545) of the link(s) specified in TID-to-Link mapping. The upper MAC sublayer 550 of receiving MLD 510 eliminates duplicated MSDU(s) received from Link 1 and/or Link 2 based on the MLD BA agreement.

According to some embodiments, the LLC can provide traffic QoS information of application through MAC-SAP interface 520 using MA-UNITDATA.request based on one or more of: source address; destination address; routing information; data; priority; drop eligible; service class; station vector; MSDU format; Delay Bound; and ETR. If the Delay Bound and/or ETR values are not included, the upper MAC sublayer of MLD may derive from TSPEC or QoS characteristics of the transmission QoS information, including Delay Bound and/or ETR using the traffic priority information received from MA-UNITDATA, or use default value of Delay Bound and/or ETR for a traffic category.

According to some embodiments, transmitting MLD 505 can measure the reliability of transmitted packets in a specified period. The transmission reliability can be measured on the upper MAC sublayer and/or on the lower MAC sublayer of each of transmitting links. Based on the measurement results, transmitting MLD 505 can determine how to configure upper MAC sublayer 525 for duplicating or non-duplicating transmission to meet Delay Bound and ETR requirements. For example, if the upper MAC sublayer 525 is configured to perform duplicating transmission, the upper MAC sublayer 525 can duplicate the received MSDU from upper layer using the same identifier. The duplicated packet identifier can consist of a destination MLD MAC address, a source MLD MAC address, and a sequence number, or a Stream ID and Sequence Number. A QoS MSDU is categorized by a traffic ID (i.e., TID). The distribution of MSDU to lower MAC sublayer and PHY sublayer of one or more links is controlled by the TID to Link mapping. For example, upper MAC sublayer 525 distributes the duplicated MSDUs to lower MAC sublayer (e.g., 530 and 535) and PHY sublayer (e.g., 540 and 545) of multiple links (e.g., Link 1 and Link 2) and transmits in a PPDU or multiple PPDUs on multiple links, if the TID of the QoS MSDU is mapped to all links (e.g., Link 1 and Link 2). Alternatively, upper MAC layer 525 may distribute duplicated MSDUs to the lower MAC sublayer (e.g. 530 or 535) and the PHY sublayer (e.g., PHY 540 or 545) of a single link and transmits in a PPDU (or multiple PPDU), if the TID of the QoS MSDU is mapped to one of multiple links (e.g., Link 1 or Link 2). If the upper MAC sublayer 525 is configured to perform non-duplicating transmission, upper MAC sublayer 525 does not duplicate MSDU 515 and forwards MSDU 515 to the lower MAC sublayer (e.g., 530 and/or 535) and the PHY sublayer (e.g., 540 and/or 545) of the link(s) specified in TID-to-Link mapping.

Figure 6:
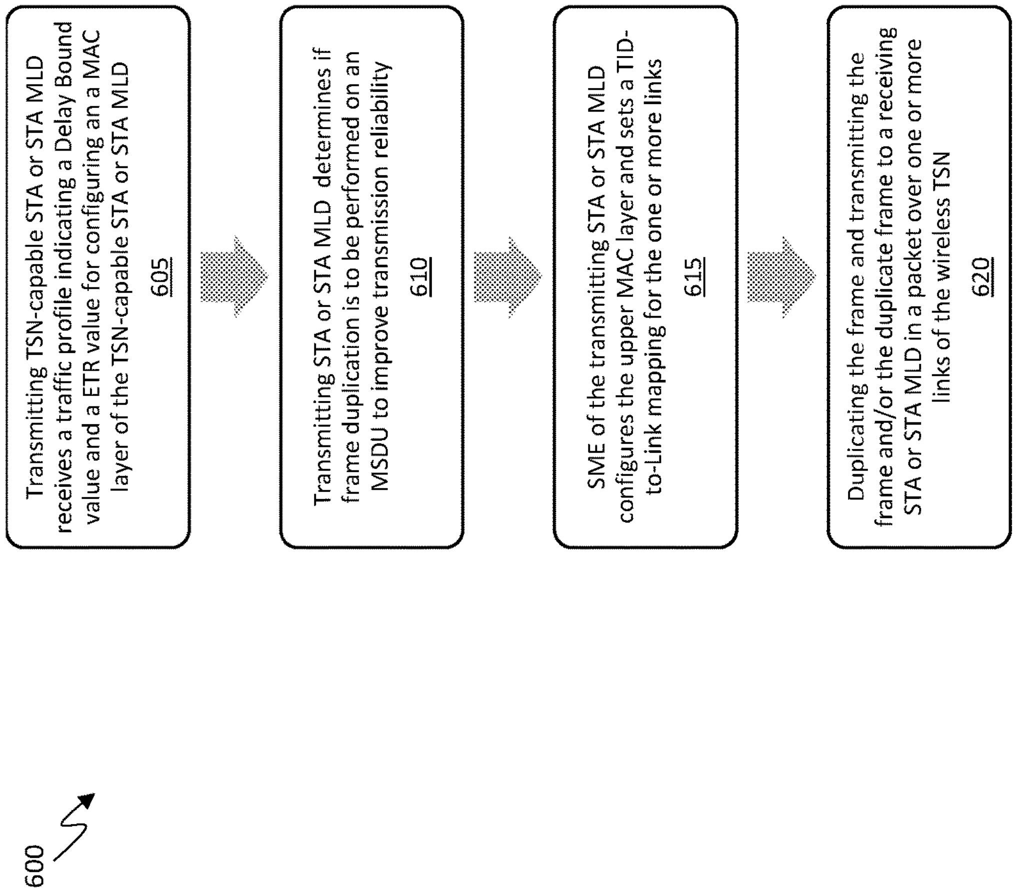
FIG. 6 is a flow chart depicting an exemplary sequence of computer implemented steps of a process for wirelessly transmitting data in a multi-AP TSN to improve transmission reliability according to embodiments of the present invention.

FIG. 6 is a flow chart depicting an exemplary sequence of computer implemented steps of a process 600 for transmitting data in a multi-AP TSN to improve transmission reliability according to embodiments of the present invention.

At step 605, a transmitting TSN-capable STA or STA MLD receives a traffic profile indicating a Delay Bound value and a ETR value. The traffic profile can be configured by a SME of the transmitting STA or STA MLD and passed through an MLME interface, or received from an LLC through a data interface (e.g., MAC-SAP). The traffic profile can be received from a TSN CS.

At step 610, the transmitting STA or STA MLD determines if frame duplication is to be performed on an MSDU to improve transmission reliability for transmission over one or more wireless links of a wireless TSN according to the traffic profile. Step 610 can further include the transmitting STA or STA MLD performing a reliability measurement (e.g., a QoS measurement) to determine if frame duplication is necessary to improve transmission reliability. The duplicate frame has the same identifier as the original frame, and can include a Destination AP MLD MAC address, a Source STA or STA MLD MAC address and a Sequence Number, or a Stream ID and a Sequence Number. If the transmitting STA or STA MLD determines that transmission reliability is sufficient without frame duplication, the frame can be transmitted to a receiving AP MLD in a PPDU without duplication.

At step 615, the SME of the transmitting STA or STA MLD configures the upper MAC sublayer and sets a TID-to-Link mapping for the one or more links according to configuration information. The configuration information may be received from a TSN configuration server through an upper sublayer protocol via a management interface, or received from an application through LLC interface.

At step 620, the packet and/or the duplicate packet are transmitted to multiple APs or APs affiliated with AP MLD over the wireless TSN. The APs can transmit the QoS packets to TSN entities (e.g., a TSN switch) of the TSN through a DS of the APs for delivery to a destination device over wired connection, like Ethernet, or wireless connection like WLAN.

Figure 7:
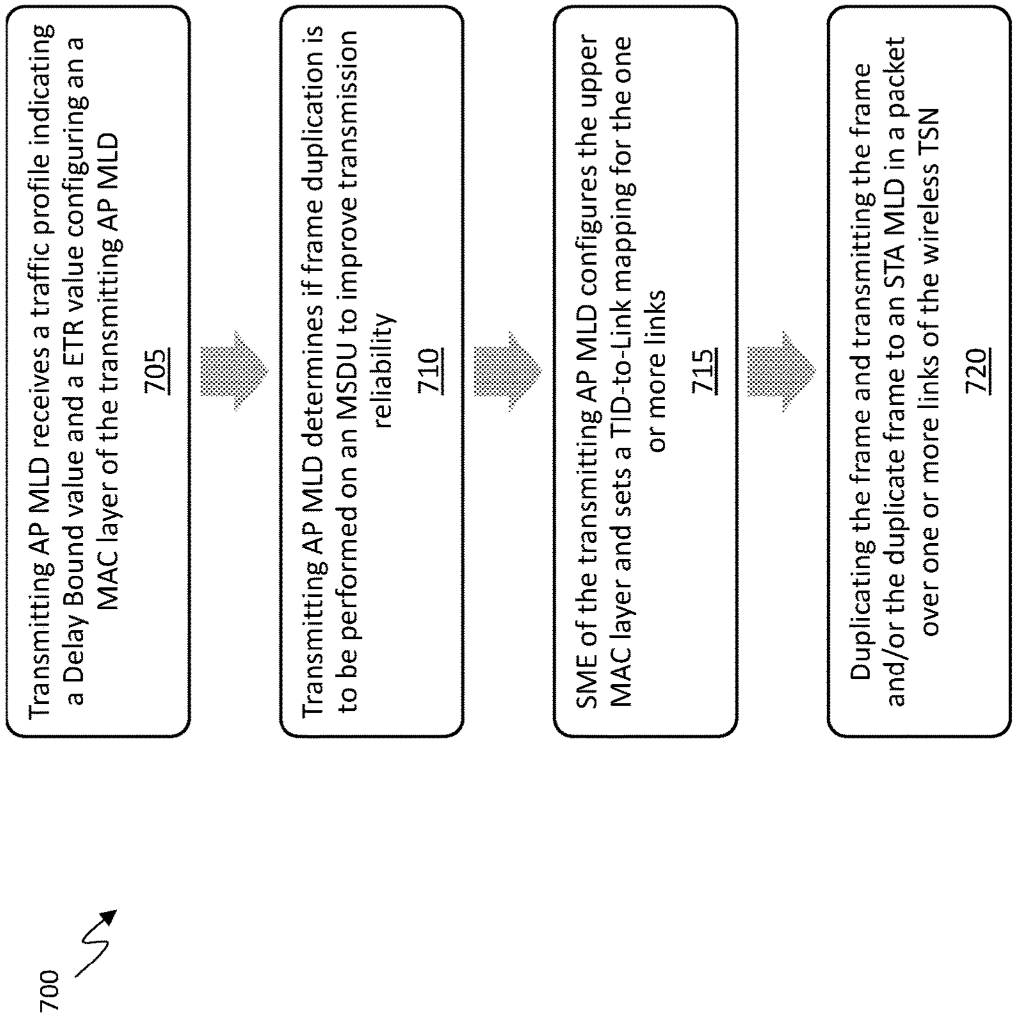
FIG. 7 is a flow chart depicting an exemplary sequence of computer implemented steps of a process for wirelessly transmitting data over multiple links of a TSN-capable MLD to improve transmission reliability according to embodiments of the present invention.

FIG. 7 is a flow chart depicting an exemplary sequence of computer implemented steps of a process 700 for transmitting data over multiple links of a TSN-capable AP MLD to improve transmission reliability according to embodiments of the present invention.

At step 705, a transmitting AP MLD receives configuration information (e.g., a traffic profile) indicating a Delay Bound value and a ETR value. The traffic profile can be configured by a SME of the transmitting AP MLD and passed through an MLME interface, or received from an LLC through a data interface (e.g., an MAC-SAP interface).

At step 710, a transmitting AP MLD determines if frame duplication is to be performed on an MSDU to improve transmission reliability for transmission over multiple wireless links of a wireless TSN according to the traffic profile. Step 710 can further include the transmitting AP MLD performing a reliability measurement (e.g., a QoS measurement) to determine if frame duplication is performed. The duplicate frame has the same identifier as the original frame, and can include a Destination STA MLD MAC address, a Source AP MLD MAC address and a Sequence Number, or a Stream ID and a Sequence Number. If the transmitting AP MLD determines that transmission reliability is sufficient without frame duplication, the frame can be transmitted to an STA MLD in a PPDU without duplication.

At step 715, the SME of the transmitting AP MLD configures the upper MAC sublayer and sets a TID-to-Link mapping for the one or more links according to configuration information. The configuration information may be received from a TSN configuration server through an upper layer protocol via a management interface.

At step 720, the packet and/or the duplicate packet are transmitted to an STA MLD over one or more links of the wireless TSN. Alternatively, the packets can be transmitted in a PPDU or multiple PPDUs over a single link. The AP MLD can receive packets from TSN entities (e.g., a TSN switch) of the TSN through a DS of the AP MLD.

Exemplary Computer Controlled System

Figure 8:
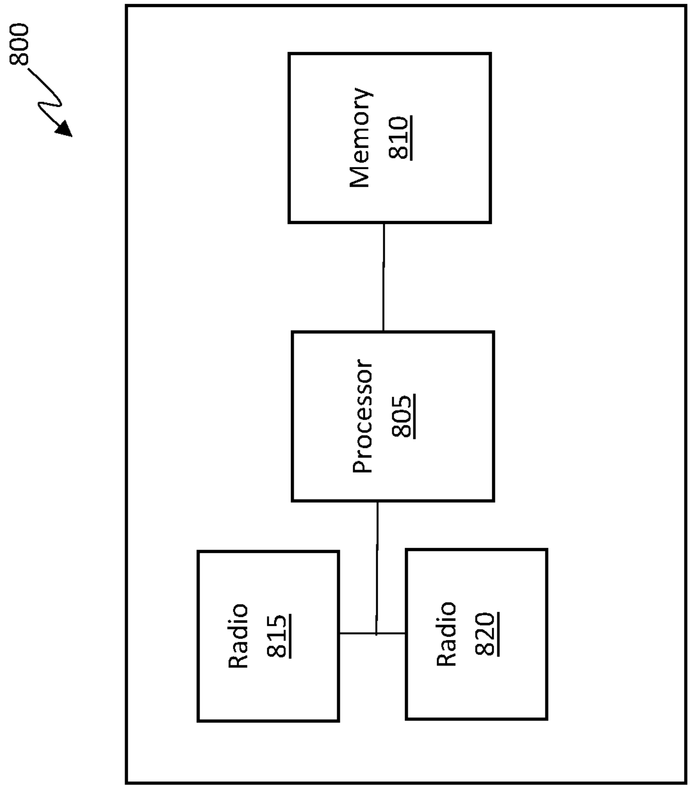
FIG. 8 is a block diagram depicting an exemplary computer system platform upon which embodiments of the present invention may be implemented.

FIG. 8 depicts an exemplary wireless device 800 upon which embodiments of the present invention can be implemented. Embodiments of the present invention are drawn to wireless devices capable of performing duplicating transmission in a wireless TSN according to embodiments of the present invention. Wireless device 800 can determine if duplicating transmission will be performed according to traffic reliability information, such as Delay Bound and ETR for a traffic category (e.g., TID). According to some embodiments, a traffic reliability measurement can be performed to determine if frame duplication is necessary. Duplicate frames can be transmitted over multiple wireless links of an MLD, or multiple frames can be transmitted over a wireless link or links according to a TID-to-Link mapping. In some embodiments, wireless device 800 is as single link (single radio) device, and transmits multiple frames over the single link to improve reliability of TSN transmissions.

Wireless device 800 includes a processor 805 for running software applications and optionally an operating system. Memory 810 can include read-only memory and/or random-access memory, for example, to store applications and data (e.g., tables of index values) for use by the processor 805 and data received or transmitted by radios 815 and 820. Radios 815 and 820 can communicate with other electronic devices over a wireless network (e.g., WLAN) using multiple spatial streams (e.g., multiple antennas) and typically operates according to IEEE standards (e.g., IEEE 802.11ax, IEEE 802.11ay, IEEE 802.11be, etc.). Radios 815 and 820 can perform multi-link operations including multi-link time sensitive transmissions. Wireless device 800 can including more than two radios, according to embodiments. The radios (e.g., radios 815 and 820) can be configured to transmit and/or receive data according to wireless transmission QoS requirements (e.g., a traffic profile), for example. Wireless device 800 is a TSN capable device that can be configured for wireless time sensitive transmission by a TSN configuration server.

Embodiments of the present invention are thus described. While the present invention has been described in particular embodiments, it should be appreciated that the present invention should not be construed as limited by such embodiments, but rather construed according to the following claims.

What is claimed is:

1. A method of wireless data transmission in a wireless time sensitive network (TSN) by a TSN-capable wireless station (STA), the method comprising:

receiving transmission information for wireless TSN transmission, wherein the transmission information comprises a traffic profile with quality-of-service (QoS) parameters comprising a latency bound and a reliability requirement;

configuring the TSN-capable STA for uplink transmission according to the transmission information;

determining if frame duplication is to be performed by an upper MAC layer according to the traffic profile of the transmission information and a measured transmission reliability;

enabling frame duplication on the upper MAC layer based on the determining;

duplicating a frame for transmission over the wireless TSN using a media access control (MAC) layer of the TSN-capable STA comprising the upper MAC layer and a lower MAC layer to create a duplicate frame, wherein the enabling frame duplication is performed by the upper MAC layer, and wherein further the duplicating is performed by the upper MAC layer using a stream identifier (ID) and sequence number;

transmitting the frame to a first wireless access point (AP) over the wireless TSN; and transmitting the duplicate frame to a second wireless AP over the wireless TSN.

2. The method of claim 1, wherein the traffic profile comprises a Delay Bound value and an Expected Transmission Reliability (ETR) value.

3. The method of claim 2, further comprising determining a transmission reliability threshold of a wireless link according to the traffic profile, and wherein the duplicating a frame for transmission over the wireless TSN is performed responsive to a determination that a transmission reliability of a wireless link of the wireless TSN is below the transmission reliability threshold.

4. The method of claim 3, further comprising measuring a transmission reliability for transmitting data to the first wireless AP over the first wireless link.

5. The method of claim 4, wherein the measuring comprises calculating a percentage of QoS packets of a traffic category that are successfully transmitted over the wireless link within the Delay Bound value for the traffic category over the total transmitted Qos packets of the traffic category on the wireless link.

6. The method of claim 1, wherein the transmission information is received from a TSN configuration server or an application running on the transmitting device.

7. A method of wireless data transmission in a wireless time sensitive network (TSN) by a wireless station (STA) multi-link device (MLD), the method comprising:

receiving transmission information;

configuring the STA MLD for uplink transmission according to the transmission information, wherein the transmission information comprises a traffic profile with quality-of-service (QoS) parameters comprising a latency bound and a reliability requirement;

determining if frame duplication is to be performed by an upper MAC layer according to the traffic profile and a measured transmission reliability;

enabling frame duplication on the upper MAC layer based on the determining;

duplicating a frame for transmission over the wireless TSN using a media access control (MAC) layer of the STA MLD comprising the upper MAC layer and a lower MAC layer to create a duplicate frame, wherein the enabling frame duplication is performed by the upper MAC layer, and wherein further the duplicating is performed by the upper MAC layer using a stream identifier (ID) and sequence number;

transmitting the frame to a wireless access point (AP) MLD over a first wireless link of the wireless TSN; and transmitting the duplicate frame to the wireless AP MLD over a second wireless link of the wireless TSN.

8. The method of claim 7, wherein the traffic profile comprises a Delay Bound value and an Expected Transmission Reliability (ETR) value for a traffic category.

9. The method of claim 8, further comprising determining a transmission reliability threshold of a wireless link according to the traffic profile, and wherein the duplicating a frame for transmission over the wireless TSN is performed responsive to a determination that a transmission reliability of the first wireless link of the wireless TSN is below the transmission reliability threshold.

10. The method of claim 9, further comprising measuring a transmission reliability for transmitting data to the wireless AP MLD over the first wireless link.

11. The method of claim 10, wherein the measuring comprises at least one of:

calculating a ratio of a number of QoS packets of the traffic category that are successfully transmitted over the first wireless link within the Delay Bound value for the traffic category to a total number of transmitted QoS packets of the traffic category on the first wireless link; and calculating a ratio of a number of QoS packets of the traffic category that are successfully transmitted over all wireless transmitting links within the Delay Bound value for the traffic category to a total number of transmitted QoS packets of the traffic category on all wireless links.

12. The method of claim 7, wherein in the transmission information is received from a TSN configuration server or an application running on the transmitting device.

13. An apparatus for wireless data transmission in a wireless time sensitive network (TSN) by a wireless station (STA) multi-link device (MLD), the apparatus comprising:

a processor;

a memory coupled to the processor and for storing data; and a plurality of radios operable to perform wireless TSN transmission, and wherein the processor is operable to:

store transmission information in said memory;

configure uplink transmission according to the transmission information, wherein the transmission information comprises a traffic profile with quality-of-service (QoS) parameters comprising a latency bound and a reliability requirement;

determine if frame duplication is to be performed by an upper MAC layer according to the traffic profile and a measured transmission reliability to make a determination;

enable frame duplication on the upper MAC layer based on the determination; duplicate a frame for transmission over the wireless TSN using a media access control (MAC) layer of the TSN-capable STA comprising the upper MAC layer and a lower MAC layer to create a duplicate frame, wherein the enabling frame duplication is performed by the upper MAC layer, and wherein further the duplicating is performed by the upper MAC layer using a stream identifier (ID) and sequence number;

transmit the frame to a first wireless access point (AP) over the wireless TSN; and transmit the duplicate frame to a second wireless AP over the wireless TSN.

14. The apparatus of claim 13, wherein the traffic profile comprises a Delay Bound value and an Expected Transmission Reliability (ETR) value.

15. The apparatus of claim 14, wherein the processor is further operable to determine a transmission reliability threshold according to the traffic profile, and wherein the duplicate a frame for transmission over the wireless link is performed responsive to a determination that a transmission reliability of the first wireless link of the wireless TSN is below the transmission reliability threshold.

16. The apparatus of claim 15, wherein the processor is further operable to measure a transmission reliability for transmitting data to the wireless AP MLD over the first wireless link.

17. The apparatus of claim 16, wherein the measure comprises at least one of: calculating a ratio of a number of QoS packets of a traffic category that are successfully transmitted over the first wireless link within the Delay Bound value for the traffic category to a total number of transmitted QoS packets of the traffic category on the first wireless link; and calculating a ratio of a number of QoS packets of the traffic category that are successfully transmitted over all wireless transmitting links within the Delay Bound value for the traffic category to a total number of transmitted QoS packets of the traffic category on all wireless links.

* * * * *